F. O. SCHLUETER.
DRIVE MEANS FOR DITCHERS AND GRADERS.
APPLICATION FILED NOV. 27, 1918.
1,318,232.
Patented Oct. 7, 1919.
3 SHEETS—SHEET 1.
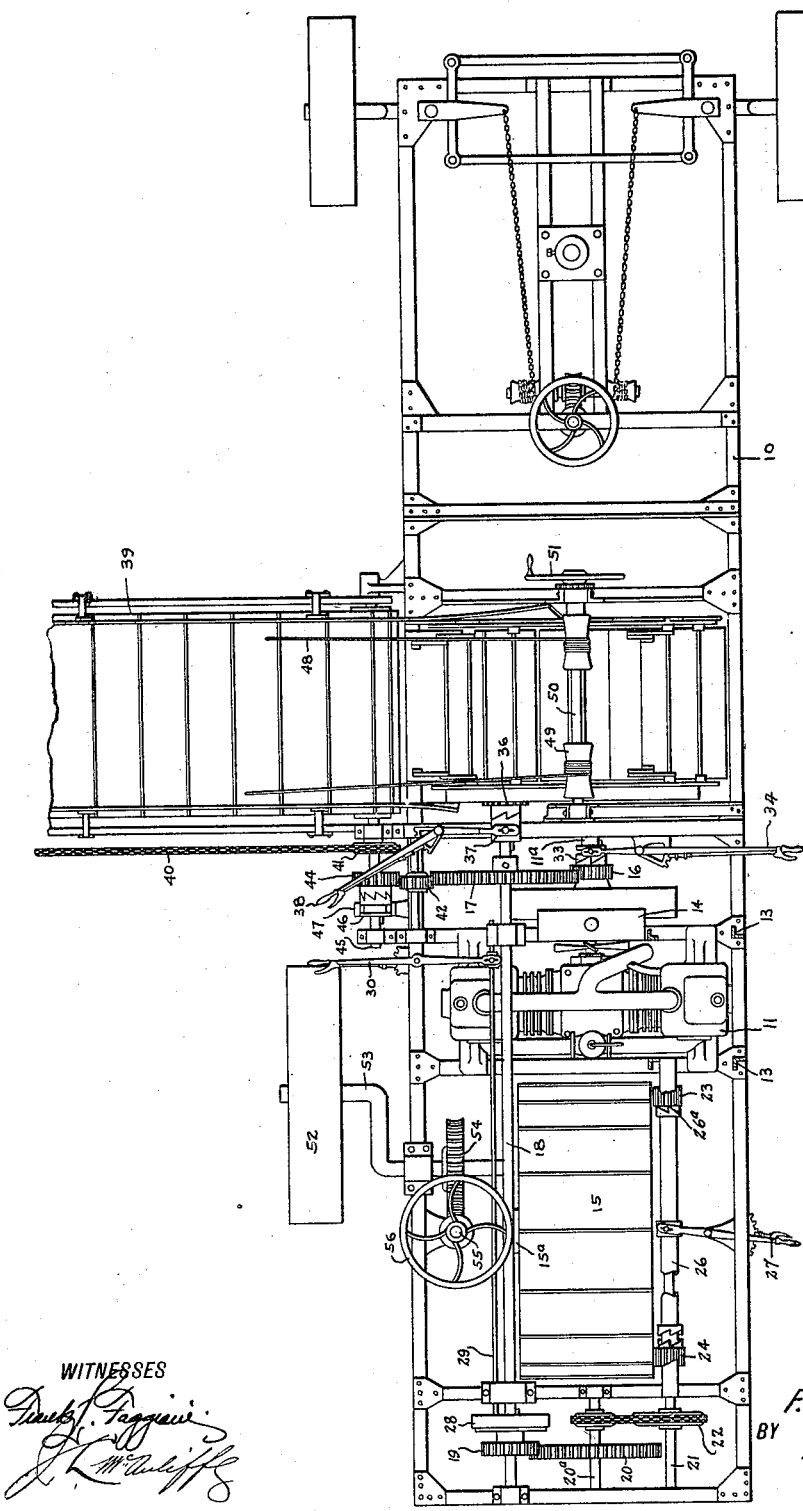
WITNESSES
INVENTOR
F. O. Schlueter,
BY
ATTORNEYS F. O. SCHLUETER.
DRIVE MEANS FOR DITCHERS AND GRADERS.
APPLICATION FILED NOV. 27, 1918.
1,318,232.
Patented Oct. 7, 1919.
3 SHEETS—SHEET 2.
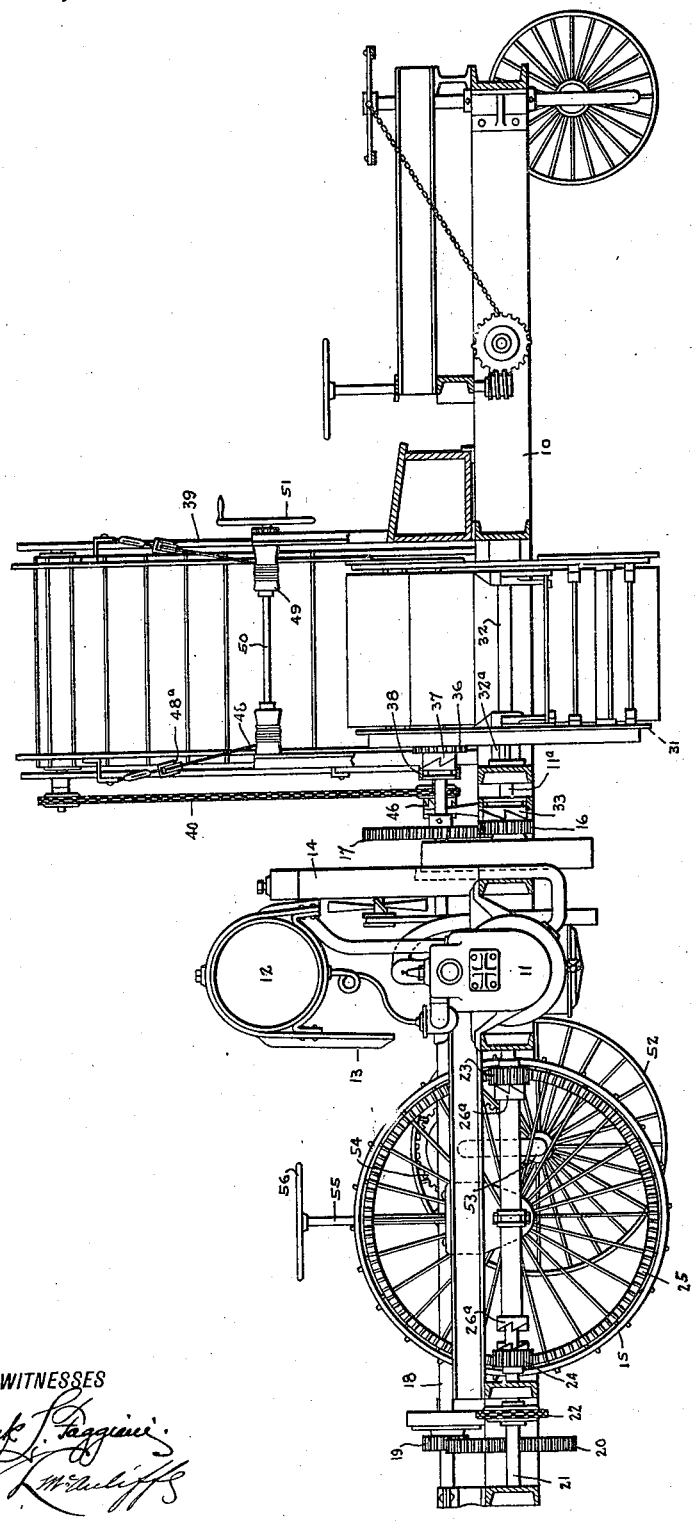
WITNESSES
INVENTOR
F. O. Schlueter
BY
ATTORNEYS F. O. SCHLUETER.
DRIVE MEANS FOR DITCHERS AND GRADERS.
APPLICATION FILED NOV. 27, 1918.
1,318,232.
Patented Oct. 7, 1919.
3 SHEETS—SHEET 3.
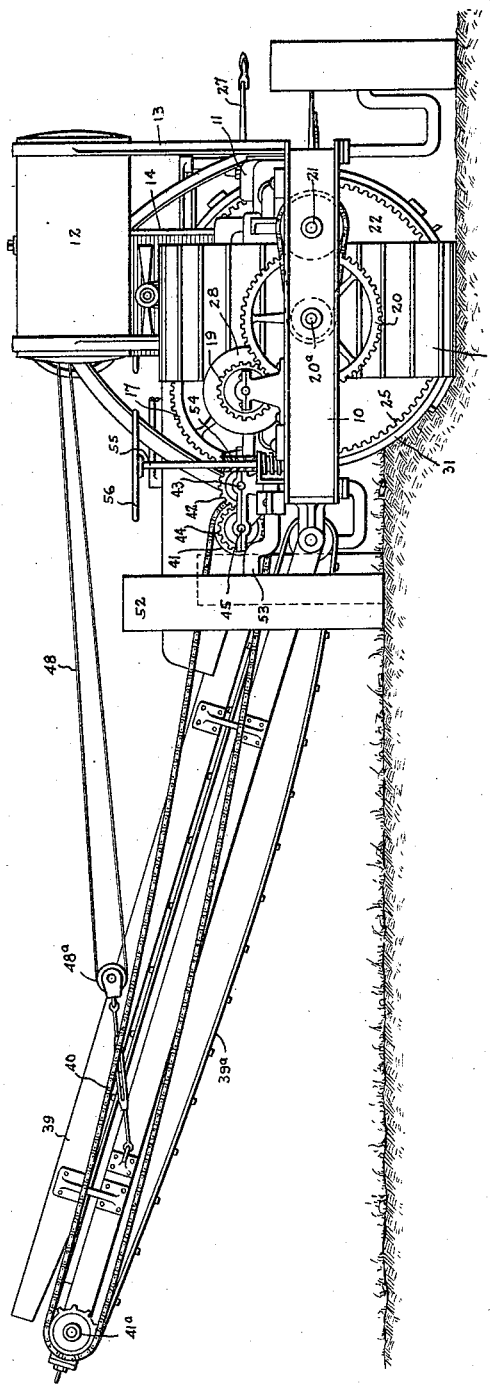
INVENTOR
F. O. Schlueter,

UNITED STATES PATENT OFFICE.

FRIDRICH OTTO SCHLUETER, OF SCRIBNER, NEBRASKA.

DRIVE MEANS FOR DITCHERS AND GRADERS.

1,318,232.           Specification of Letters Patent.      Patented Oct. 7, 1919.

Original application filed March 6, 1918, Serial No. 213,510. Divided and this application filed November 27, 1918. Serial No. 264,384.

*To all whom it may concern:*

Be it known that I, FRIDRICH OTTO SCHLUETER, a citizen of the United States, and a resident of Scribner, in the county of Dodge and State of Nebraska, have invented a new and Improved Drive Means for Ditchers and Graders, of which the following is a description.

My invention relates to a tractor-driven machine adapted for ditching, road grading, and like work, and particularly has reference to the ditcher and grader forming the subject matter of an application for United States patent filed by me March 6, 1918, Serial No. 213,510, of which the present application is a division.

The object of the present invention is to provide in a machine of the indicated class, a drive means, the general construction and arrangement of the elements in which are such as to result in a well-balanced and compact structure making for facility of operation and control.

Reference is to be had to the accompanying drawings forming part of this specification, it being understood that the drawings are merely illustrative of one example of the invention.

Figure 1 is a plan view of a machine embodying my invention, the fuel tank being omitted and a portion of the tank-supporting means being broken away;

Fig. 2 is a side elevation, the frame parts being in section;

Fig. 3 is a rear view.

In constructing a practical embodiment of my invention, a suitable frame 10 is provided in which is mounted a motor 11, here indicated as an internal combustion engine supplied with fuel from an overhead tank 12 on suitable supporting elements 13. The numeral 14 indicates a radiator.

A single bull wheel or tractor wheel 15 is centrally positioned in the frame 10 at the rear of the machine, the character 15$^a$ indicating the axle thereof. The engine as well as various drive shafts and other elements establishing drive connection between the engine and the tractor wheel are disposed in the frame 10 about the tractor wheel, the arrangement making for compactness and for the production of a balanced structure. Said drive means includes a pinion 16 loose on the engine shaft 11$^a$ and adapted to be driven by a clutch 33 on said shaft, the numeral 34 indicating a clutch lever. The pinion 16 meshes with a gear wheel 17 on the shaft 18 extending longitudinally in the frame along one side of the tractor wheel 15, and at the rear end the shaft 18 has a pinion 19 meshing with a pinion 20 on a countershaft 20$^a$ which has driving connection with a clutch shaft 21 disposed longitudinally of the frame at the opposite side of the tractor wheel from the shaft 18. The drive connection between the shaft 20$^a$ and the shaft 21 may be of any approved form, there being indicated in the illustrated example a sprocket drive designated 22. On the shaft 21 are front and rear loose pinions 23, 24 meshing with an annular rack or gear wheel 25 on the tractor wheel 15. A clutch sleeve 26 is slidable on the shaft 21 relatively to the pinions 23, 24 and said sleeve and pinions have mating clutch elements as indicated at 26$^a$. The sleeve is shifted by a suitable clutch lever 27 for causing either pinion 23, 24 to be driven by the shaft 21 through the sleeve 26 for turning the tractor wheel 15 forwardly or back. The numeral 28 indicates conventionally a disk clutch on the shaft 18 so that the drive connection between the engine and the shaft 21 may be established or disestablished independently of the directional clutch 26. The clutch 28 is controlled by a shift rod 29 movable by a lever 30.

A shovel wheel is employed in my ditching and grading machine to be driven by the improved drive, said wheel being designated generally by the numeral 31. Said wheel turns about an axis disposed longitudinally of the machine, that is to say, the wheel turns in a plane transverse to the direction of travel of the machine. In the illustrated example the shovel wheel 31 turns about a fixed shaft 32 supported in any suitable manner in the frame 10, there being indicated a supporting clamp bracket 32$^a$ at that end of the shaft 32 adjacent to the engine shaft 11$^a$. The drive means for the shovel wheel 31 includes a gear wheel or annular rack in fixed relation to said wheel meshing with which rack is a pinion 36 loose on the shaft 18 and controlled by a clutch 37, including clutch elements on the pinion 36 and adjacent to the same on the shaft 18, the clutch being controlled by a lever 38, so that the throwing of the lever establishes driving connection between the shaft 18 and the pinion 36 or disestablishes the driving connection.

The material discharged by the shovel wheel may be disposed of in any suitable manner, there being indicated a transversely disposed elevator apron 39 which is here shown as an endless apron 39$^a$. A sprocket driven chain 40 drives the apron, the drive sprocket for the chain being indicated at 41 and an idler sprocket at 41$^a$ (Fig. 4), on the shaft of which latter sprocket is a drive drum for the apron 39$^a$. Any suitable drive connection is established between any of the driven shafts and the elevator drive, there being illustrated as one example, a pinion 42 in mesh with the gear wheel 17, said pinion being on a shaft 43 and meshing in turn with a pinion 44 on the shaft 45 carrying the drive sprocket 41. To control the drive connection any clutch 46 may be provided on the shaft 45 and controlled by a lever 47. The elevator 39 is adapted to be raised and lowered by a tackle including cables 48 run through pulley blocks 48$^a$ secured to the elevator near the upper end and winding on drums 49 on the drum shaft 50 which is manually operable by a handwheel 51 or the like.

To regulate the depth of the cut, a depth gage wheel 52 is provided and mounted loosely on a crank axle 53 turning in suitable bearings on the frame 10 and having a worm wheel 54 thereon driven by a worm shaft 55 having a hand wheel 56 at the top; said depth gage wheel and its controlling means, however, form no part of the present invention.

Any suitable steering means may be provided, the means shown forming no part of the present invention, it is not here described.

I would state in conclusion that while the illustrated example constitutes a practical embodiment of my invention, I do not limit myself strictly to the mechanical details herein illustrated, since manifestly the same can be considerably varied without departure from the spirit of the invention.

Having thus described my invention, I claim as new, and desire to secure by Letters Patent:

A machine of the class described adapted to travel and including a frame, a tractor wheel approximately central thereon, a motor on the frame disposed transversely to the plane of rotation of the tractor wheel, and drive means between the tractor wheel and motor, said drive means including a shaft disposed longitudinally along a side of the tractor wheel and adapted to be driven by the motor, a shaft disposed along the opposite side of the tractor wheel, drive connections between said shafts at the opposite side of the axis of the wheel from that at which the motor is disposed, and means to establish or disestablish driving connection between the second shaft and the tractor wheel.

FRIDRICH OTTO SCHLUETER.